L. P. CARHART.
SPRING.
APPLICATION FILED SEPT. 2, 1916.

1,281,511.

Patented Oct. 15, 1918.

INVENTOR
Lansdon Peter Carhart
BY
Attorney

UNITED STATES PATENT OFFICE.

LINDEN PETER CARHART, OF BROOKLYN, NEW YORK.

SPRING.

1,281,511.

Specification of Letters Patent.  Patented Oct. 15, 1918.

Application filed September 2, 1916.  Serial No. 118,164.

*To all whom it may concern:*

Be it known that I, LINDEN PETER CARHART, a citizen of the United States, and resident of the borough of Brooklyn, county of Kings, city and State of New York, have invented certain new and useful Improvements in Springs, of which the following is a specification.

This invention relates to the construction of springs particularly well adapted for use on vehicles and more especially automobiles, where the vibrations are frequent and often of very great extent.

The object of the invention is to provide a spring, the separate leaves of which are supported away from each other by frictionless supports and in this construction I eliminate entirely the objectionable noise or squeak occasioned by the rubbing of poorly lubricated parts and I also add to the efficiency of the spring and make it more active and resilient.

The following is what I consider a good means of carrying out this invention and the accompanying drawings should be considered together with the specification which follows:

In the drawings.

Similar reference numerals indicate like parts in all of the figures where they appear.

Figure 1:
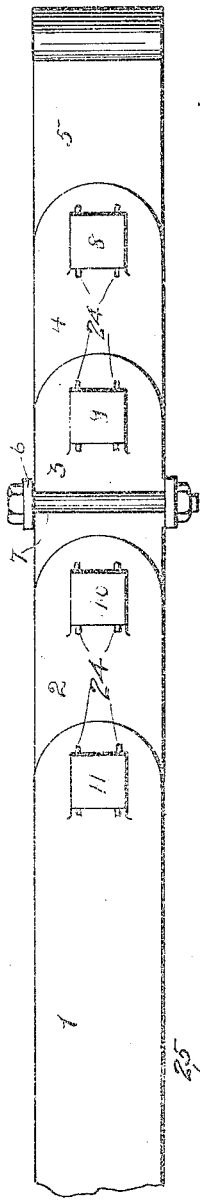
Figure 1 shows in plan view an end portion of a spring.
Figure 3:
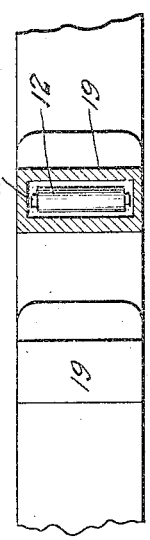
Fig. 3 is a fractional plan view partly in section.

The spring used in conjunction with my invention may be of any general type, shape or size, it may be an ordinary leaf spring or a cantaliver spring or any of the special springs that have been adopted to meet certain operating requirements.

In the description which follows I will refer only to the small portion of a spring shown in the drawings and I indicate the several leaves of the spring at 1, 2, 3, 4 and 5.

To prevent an undue separation of the springs during a rebound I may place a clamp 6, and stud 7 upon certain of the leaves. A number of these clamps may be employed or on a spring operating in a small radius, the clamps may be omitted.

Figure 2:
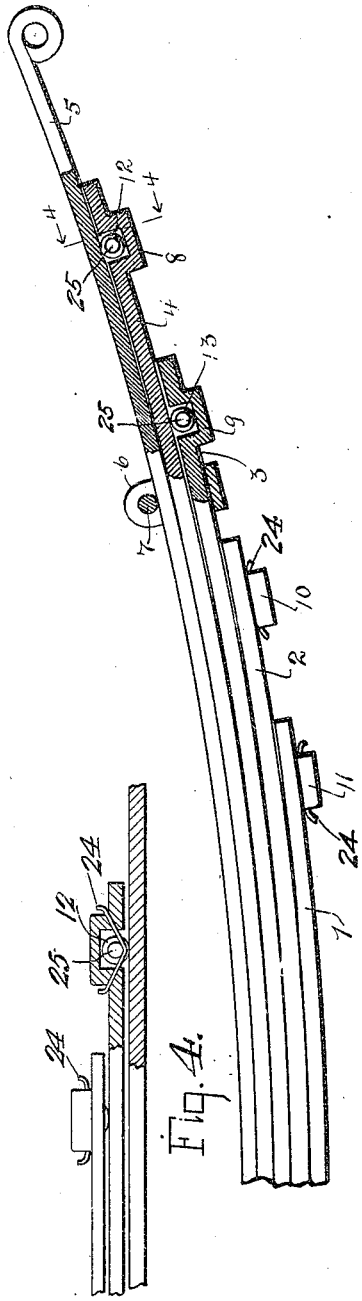
Fig. 2 is an elevation of the spring shown in Fig. 1, and this figure is partly in section.

Formed integral with and adjacent to each end of each leaf of the spring is a cup, which may be produced by depressing a portion of the spring out of the general plane and in Figs. 1 and 2, such cups are shown at 8, 9, 10 and 11.

Within each of the cups 8, 9, 10 and 11, I place a roller as shown at 12 and 13, and this roller will bear against the inner bottom of the cup and against the surface of the leaf next adjacent to the open end of the cup and will be of a size sufficient to retain adjacent leaves short distances away from each other.

When placing the rollers in their respective cups I may insert with each roller a quantity of a lubricant, such as Albany grease, or vaseline and I prefer a paste lubricant rather than a free oil for as the roller has but a small amount of movement a paste will efficiently lubricate and will not jar out of its cup.

Figure 4:
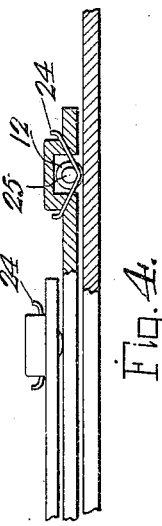
Fig. 4 is an elevation partly in section.

In my experiments I have discovered that some springs are subject to a great separation between the ends of the leaves particularly upon the rebound. It may be possible that if a shallow cup is used the roller may have a tendency to leave the cup during the rebound of the spring. This might be the case particularly where a spring is used in a reversed position. To avoid this I produce perforations through the angles between the cups and their respective spring leaves and at approximately the ends of each cup and through these perforations, I introduce a small wire spring member 24 arched as shown in Fig. 4 and engaged upon the reduced ends 25 of the roller 12.

From the description of the construction it is thought that the operation of my ball-bearing spring will be entirely understood. I will, however, state in detail the general principles of the operation.

Consider a spring, the ends of which are constructed as shown and described herein, operating under ordinary conditions. When the vehicle is loaded the springs will be depressed and the rollers running freely along the surface of the next adjacent leaf, will allow the leaf wherein they are contained to move to any required extent. Now, during the movement of the vehicle and when the separate leaves of the spring are in almost constant relative motion, the rollers will operate as very efficient and well lubricated bearings and will not only allow a full relative movement of adjacent parts but will also lubricate the relatively movable surfaces, with the result that sticking or squeaking of springs will be unknown.

My construction also increases the range of operation of the springs: by freeing the leaves from frictional engagement with each other and adds to the life of the springs by assuring that each leaf will travel to the full extent required of it and that all leaves will recover with equal facility.

I believe that parts may be used without the whole with certain advantages and that modifications may be made within the scope of the appended claim without departing from the principle or sacrificing the advantages of the invention.

Having carefully and fully described my invention what I claim and desire to secure by Letters Patent is:

A spring having a plurality of leaves, a cup formed in the end of certain of said leaves and provided with a plurality of perforations, a movable anti-friction bar member within each said cup and having its ends reduced and wire members extending over said reduced portions and through said perforations for retaining said members within their respective cups as and for the purpose set forth.

Signed at New York city, New York, this 29 day of Aug., 1916.

LINDEN PETER CARHART.